(12) United States Patent
Nikolin et al.

(10) Patent No.: US 8,220,784 B2
(45) Date of Patent: Jul. 17, 2012

(54) VENTILATION OF DRAINAGE SYSTEM FOR FRAME ENGINE EVAPORATIVE COOLER

(75) Inventors: Przemyslaw Krzysztof Nikolin, Reading (GB); William Keith Albert Eyers, Chobham Surrey (GB); Peter John Duncan Smith, Basingstoke Hampshire (GB)

(73) Assignee: General Electric Company, Schenectady, NY (US)

( * ) Notice: Subject to any disclaimer, the term of this patent is extended or adjusted under 35 U.S.C. 154(b) by 463 days.

(21) Appl. No.: 12/567,083

(22) Filed: Sep. 25, 2009

(65) Prior Publication Data

US 2011/0074051 A1   Mar. 31, 2011

(51) Int. Cl.
*B01F 3/04* (2006.01)
(52) U.S. Cl. ............... 261/118; 96/290; 96/296; 62/310
(58) Field of Classification Search .................. 261/118; 96/290, 296; 62/304, 310
See application file for complete search history.

(56) References Cited

U.S. PATENT DOCUMENTS

| | | | |
|---|---|---|---|
| 2,160,549 A | 5/1939 | Kurth | |
| 5,289,696 A | 3/1994 | Kiser et al. | |
| 6,247,327 B1 * | 6/2001 | An et al. | 62/314 |

FOREIGN PATENT DOCUMENTS

FR   2641853 A1   7/1990

OTHER PUBLICATIONS

Search Report issued in connection with corresponding GB Application No. GB 1016064 6, Feb. 11, 2011.

* cited by examiner

*Primary Examiner* — Robert A Hopkins
(74) *Attorney, Agent, or Firm* — Pearne & Gordon LLP

(57) ABSTRACT

An evaporative cooler for cooling air includes a cooling housing having an air inlet and an air outlet and an evaporation media, located within the cooling housing intermediate the air inlet and the air outlet for air flow there through and for receiving water to permit evaporation of at least some water. The evaporative cooler includes a drain pan located within the cooling housing and below the evaporation media to catch water which has not evaporated and falling from the evaporation media and a sump located within the cooling housing and below the drain pan for collecting water for use in supplying water to the evaporation media. The evaporative cooler includes a pipe connecting the drain pan to the sump for water movement from the drain pan to the sump and an air vent located within the cooling housing and connected to the pipe, the air vent being open to air within the cooling housing and above the drain pan to permit release of air from within the pipe.

5 Claims, 3 Drawing Sheets

VENTILATION OF DRAINAGE SYSTEM FOR FRAME ENGINE EVAPORATIVE COOLER

BACKGROUND OF THE INVENTION

1. Field of the Invention

The invention relates to evaporative coolers, and specifically relates to a drainage arrangement for evaporative coolers.

2. Discussion of Prior Art

An evaporative cooler may be useful where high ambient temperatures and low relative humidity are common. Within an evaporative cooler, water is added to inlet air. Part of the water evaporates absorbing latent heat from the air. As a result, the air, which gives up sensible heat, cools and increases in density. In one specific example, an evaporative cooler may be a useful option for turbine inlet air. With the use of an optional evaporative cooler, adding the water to the turbine inlet air will provide a higher mass flow rate and pressure ratio for the turbine and will cause in an increase in turbine output and efficiency. For example, considering a dry-bulb temperature of 40° C. with 20% relative humidity, the output power may be increased by about 12% if an 80% effective evaporative cooler is used. Correspondingly, the heat rate decreases by about 4%. The benefit of an evaporative cooler system from an economic point of view is related to the potential average annual increase in output from the turbine. Of course, evaporative coolers may be used in other example environments.

In general, within an evaporative cooler a spray system wets media the medium and the water flows through the media (e.g., corrugated layers of fibrous material). Air flow intermixes with the flowing water at the media. The water flows down through the media by gravity and non-evaporated water is collected within a drain pan. In turn the drain pan is connected to a sump which collects water for recirculation/reuse to the media.

It is to be appreciated that the presence of water within the evaporative cooler makes the environment within the evaporative cooler somewhat adverse. The use of materials that are adversely affected by water should be avoided. One example material that is typically used within an evaporative cooler is stainless steel. One drawback of stainless steel is a relatively high cost of material. Continued efficient operation of the evaporative cooler is a typical desired expectation. As such there is a need for a successive generation of evaporative coolers that provide improvements.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides an evaporative cooler for cooling air. The evaporative cooler includes a cooling housing having an air inlet and an air outlet. The evaporative cooler includes an evaporation media, located within the cooling housing intermediate the air inlet and the air outlet for air flow therethrough and for receiving water to permit evaporation of at least some water. The evaporative cooler includes a drain pan located within the cooling housing and below the evaporation media to catch water which has not evaporated and falling from the evaporation media. The evaporative cooler includes a sump located within the cooling housing and below the drain pan for collecting water for use in supplying water to the evaporation media. The evaporative cooler includes a pipe connecting the drain pan to the sump for water movement from the drain pan to the sump. The evaporative cooler includes an air vent located within the cooling housing and connected to the pipe, the air vent being open to air within the cooling housing and above the drain pan to permit release of air from within the pipe.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
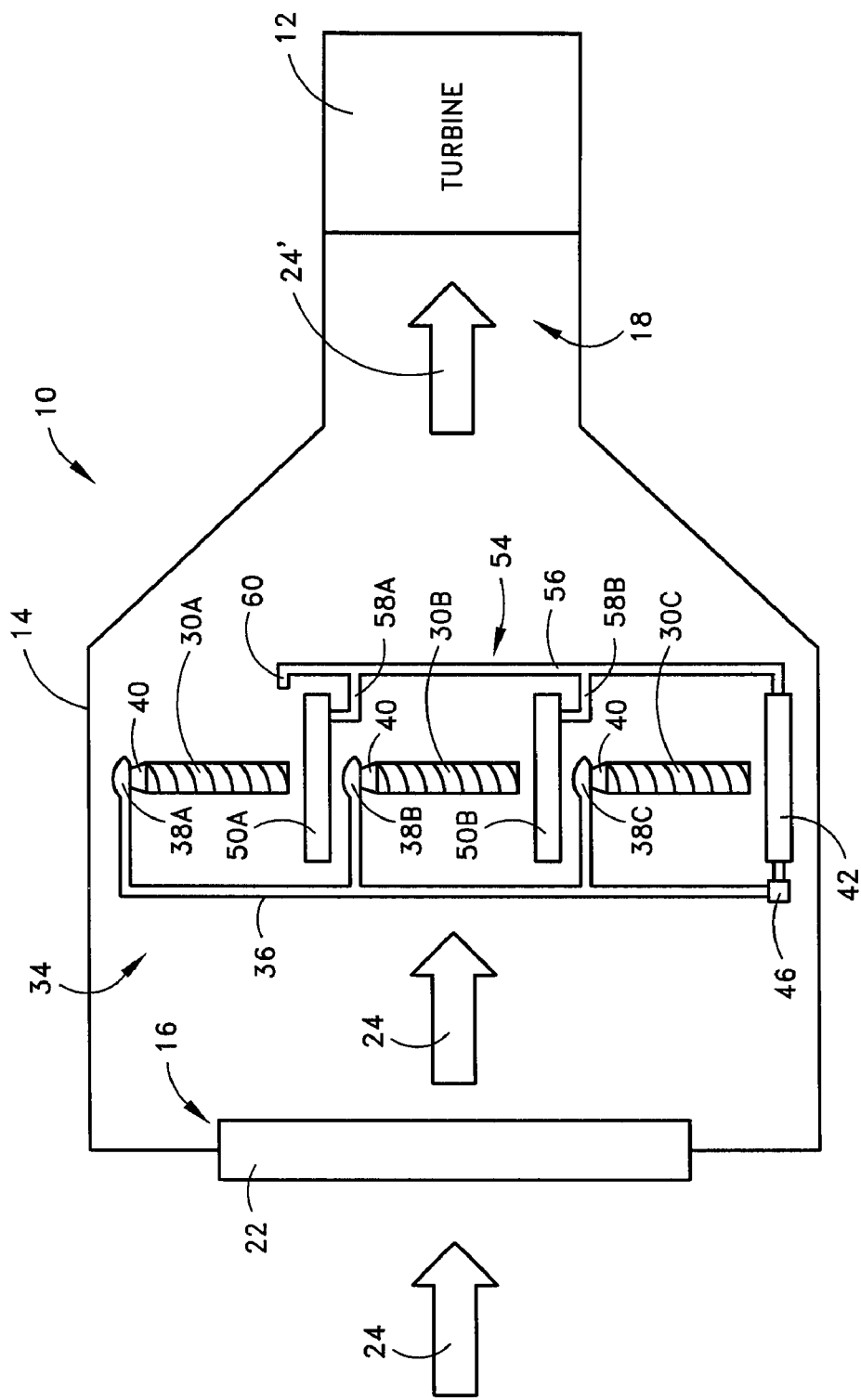
FIG. 1 is a schematic illustration of an example evaporative cooler that includes an aspect in accordance with the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example embodiment of an evaporative cooler 10 that includes an aspect in accordance with the present invention is a schematic illustrated within FIG. 1. In the shown example the evaporative cooler 10 is for use with a turbine 12. However, it is to be appreciated that the present invention need not be limited to use with a turbine.

In general, the evaporative cooler 10 includes a cooling housing 14 that has an air inlet 16 and an air outlet 18. The air outlet 18 is operatively connected to the turbine 12 as will be appreciated by the person of ordinary skill in the art. The turbine 12 is schematically shown and thus it is to be appreciated that the structure of the turbine may take any form and also that the configuration of the turbine is not a specific limitation upon the present invention.

Turning to the air inlet 16 of the evaporative cooler 10, it is to be appreciated that at or near the air inlet one or more filtering devices 22 are positioned and operated to filter out unwanted materials from an air flow 24 moving into the inlet 24 and through the cooling housing 14. Also, it is to be appreciated that the air flow 24 moving into the air inlet 16 via the filtering devices 22 is generally a warm air flow.

Located within the cooling housing 14 is at least one evaporation media 30. With the evaporation media 30 being located within the cooling housing 14, the evaporation media is located intermediate the air inlet 16 and the air outlet 18. Within the shown example, three evaporation media 30 are provided and are individually identified via the use of alphabetic suffixes A-C. Hereinafter, the evaporation media 30 may be referred to generically or collective via the use of the reference number 30, but may be referred to specifically via the use of the reference number 30 and the alphabetic suffixes A-C. The evaporation media 30 are arranged in a vertical array, with one media generally located above the other within the vertical array. Each evaporation media 30 may be made of any suitable material and may have any suitable construction. Typically, the media 30 is made of corrugated layers of fibrous materials. The corrugated layers provide channels through the media 30. Accordingly, the flow of air can pass through the media 30.

A water supply arrangement 34 is operatively connected and positioned to provide water to cause wetting of the media 30. In the shown example, a supply pipe 36 extends and is operatively connected to at least one water distribution manifold 38. The distribution manifold 38 distributes or sprays water 40 onto the evaporation media 30. Thus, the media receives the water 40 from the manifold 38 and, as will be appreciated, at least some water evaporates. Within the shown example, three water distribution manifolds 38 are provided, with each manifold being positioned above a respective media. Each distribution manifold 38 is separately connected to the supply pipe 36. The three distribution manifolds 38 are individually identified via the use of alphabetic suffixes A-C. Hereinafter, the distribution manifolds 38 may be referred to generically or collective via the use of the reference number 38, but may be referred to specifically via the use of the reference number 38 and the alphabetic suffixes A-C.

A water supply reservoir/sump 42 is provided at a lower location of the cooling housing 14. Hereinafter, this reservoir is referred to as a sump 42. The location of the sump 42 is vertically beneath the vertical array of media 30. A water pump 46 is operatively connected to the sump 42 and to the supply pipe 36. The pump 46 operates to move the water 40 from the sump 42, up the supply pipe 36 into the water distribution manifolds 38. It is to be appreciated that the sump 42 may be connected to an exterior water replenishment supply and/or an exterior drain. Also, it is to be appreciated that the water supply arrangement 34 may include various water flow regulation/control devices (not shown, e.g., at the pump) and/or other structures for periodic maintenance and the like. The person of ordinary skill in the art will appreciate various examples of such additional devices/structures.

A drain pan 50 is associated with each of the upper two media 30A, 30B. The two drain pans 50 are individually identified via the use of alphabetic suffixes A and B. Hereinafter, the drain pans 50 may be referred to generically or collective via the use of the reference number 50, but may be referred to specifically via the use of the reference number 50 and the alphabetic suffixes A and B. Each respective drain pan 50A, 50B is located within the cooling housing 14 and located below the respective media 30A, 30B. Each drain pan 50 is for catching water 40 that has not been evaporated at the media 30 and thus falls from the media into the drain pan. The drain pans 50 are located above the sump 42.

A drain pipe arrangement 54 extends from the drain pans 50 to the sump 42. Specifically, at least one vertical section 56 of the drain pipe arrangement 54 extends vertically and at each drain pan 50 one or more connection sections 58 are operatively connected between the respective drain pan 50 and the vertical section 56. As such, the sump 42, which is located below the drain pans 50, is for collecting water including water from the drain pans.

Figure 2:
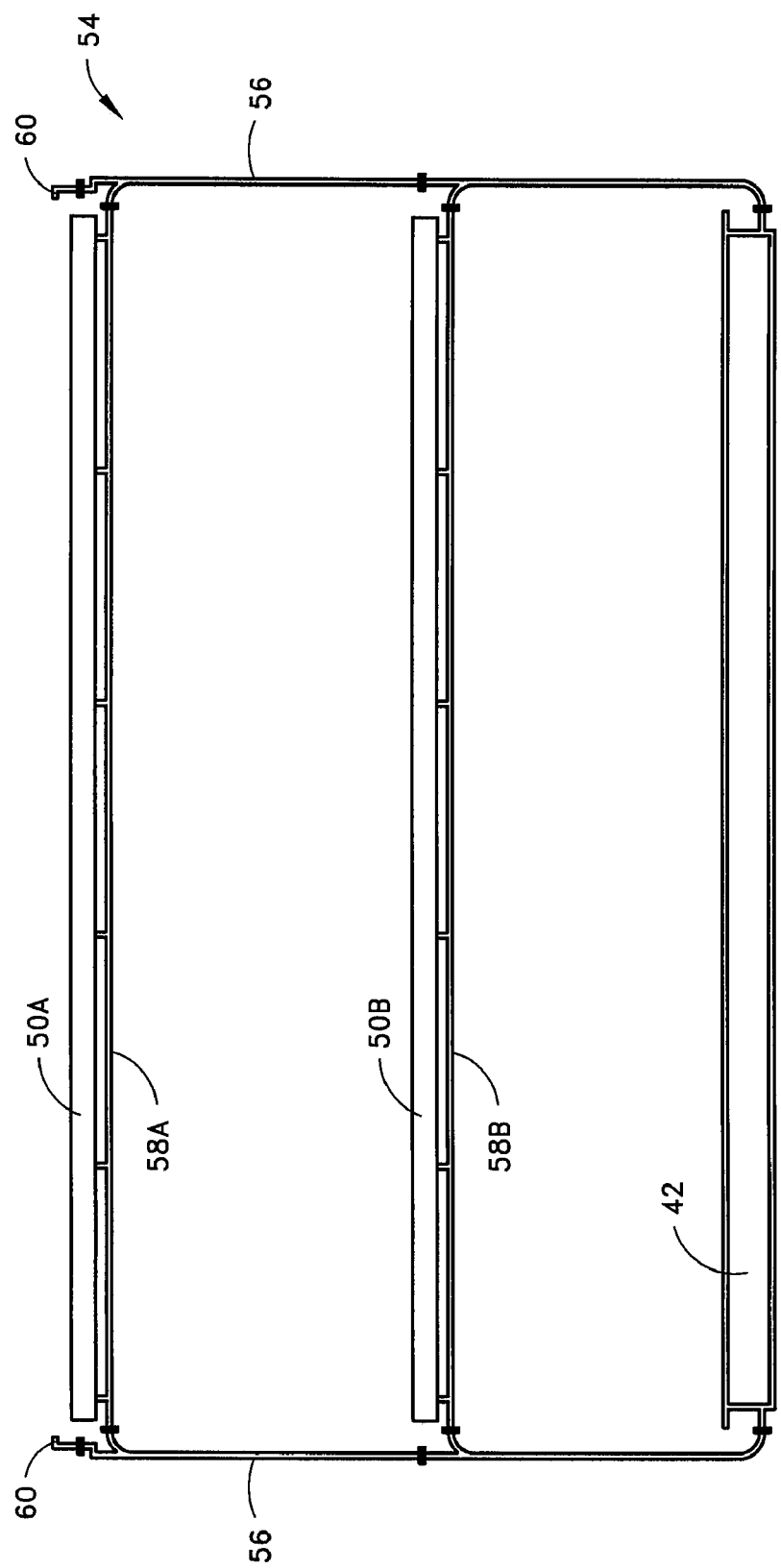
FIG. 2 is a schematic, enlarged illustration of a drain portion of the evaporative cooler of FIG. 1 and shows an aspect in accordance with the present invention.

FIG. 1 shows just a single vertical section 56 of the drain pipe arrangement 54 and FIG. 2 shows two vertical sections 56 (at opposite sides of the drain pans 50). In the shown example, the connection sections 58 are connected at a series of locations along the drain pans 50. However, it is to be appreciated that the configuration may be varied (e.g., different number/location of the connection sections). Hereinafter, the connection sections 58 may be referred to generically or collective via the use of the reference number 58, but may be referred to specifically via the use of the reference number 58 and the alphabetic suffixes A and B. It is to be appreciated that the drain pipe arrangement 54 may be constructed of any combination of pipes secured together via any suitable means (e.g., flange-bolted, welded, etc.).

In operation, the water 40 is pumped from the sump 42 through the water supply arrangement 34, including pumping the water 40 up the supply pipe 36 and out through the distribution manifolds 38 and onto the evaporation media 30. The water 40 on the media 30 wets the media but also moves downward along the media under the influence of gravity. The air flow 24 moving through the evaporative cooler 10 moves through the channels in the media 30. Water evaporates from the media 30 thus cooling the air and increasing the moisture content within the air. The cooled and moistened air flow 24' then proceeds toward the turbine 12. It is to be appreciated that the evaporative cooler 10 may have various other structures involved in the function of the evaporative cooler. For example, one or more demisters may be located downstream of the media to remove water droplets from the cooled air.

As mentioned, water 40 that is not evaporated at the media 30 eventually falls into either a respective drain pan 50 or directly into the sump 42. Water 40 that is collected within respective drain pan 50 proceeds down the drain pipe arrangement 54 and is delivered to the sump 42.

It is to be appreciated that there is a certain amount of water 40 that is recirculated within the evaporative cooler 10. Further, it is to be appreciated that it is beneficial to maintain the recirculation flow of the water 40 and not have water leave the evaporative cooler 10 in an unintended manner, have water collect within the evaporative cooler 10 in an unintended manner, or have water otherwise proceed in a manner that does not deliver the water 40 being recirculated to the sump 42.

It is to be appreciated that flow of water 40 from one or more drain pans 50 to the drain pipe arrangement 54 may be somewhat intermittent. As such, it is possible for air to be introduced/present within the drain pipe arrangement 54. In particular, it is possible for air to be introduced/present within vertical section 56 of the drain pipe arrangement 54. Also, it is possible for such air within the drain pipe arrangement 54 to cause an air lock within a drain pipe arrangement. It is to be appreciated that air locks would pose some difficulty in maintaining the recirculation flow of the water 40 through the drain pipe arrangement 54.

Also, it is to be appreciated that the environment within an evaporative cooler may be adverse to some materials. Certain types of metal are less desirable for use within an evaporative cooler due to the presence of water/moisture which can cause corrosion. As such, items made of metal, such as the pipes of a water supply arrangement and a drain pipe arrangement, may be made of stainless steel to help avoid corrosion. If fact, the use of stainless steel is common. It is to be appreciated that stainless steel is often considered to be an expensive material.

Returning to the issue of potential air locks within a drain pipe arrangement, it is possible to utilize oversized pipes within the drain pipe arrangement so that air locks are reduced. Specifically, oversized pipes would permit flow of both water and air simultaneously within a drain pipe arrangement. However, as mentioned, the material that is typically used within a drain pipe arrangement is stainless steel and thus an increased size of a stainless steel pipe would have an appreciable increase in cost.

In order to address the issues of air lock within the drain pipe and cost, the present invention provides at least one vent 60 within the drain pipe arrangement 54 to permit air flow to/from the drain pipe arrangement. The vent 60 provides at least one opening to permit air flow/release (escape). Within the shown example, the vent 60 is located at an upper extent of the vertical section 56 of the drain pipe arrangement 54. As such, the vent 60 is operatively connected to the pipes (e.g., the vertical section 56) of the drain pipe arrangement 54. With the air vent 60 being open to air within the cooling housing 14 and above the highest drain pan 50A, the air vent permits release of air from within the pipes of the drain pipe arrangement 54. Also, with the a filtering device 22 located at the air inlet 16 of the cooling housing 14 such that air within the cooling housing is filtered, the vent 60 is open to the filtered air within the cooling housing. The vent 60 is not exposed to air outside of the cooling housing 14.

Figure 3:
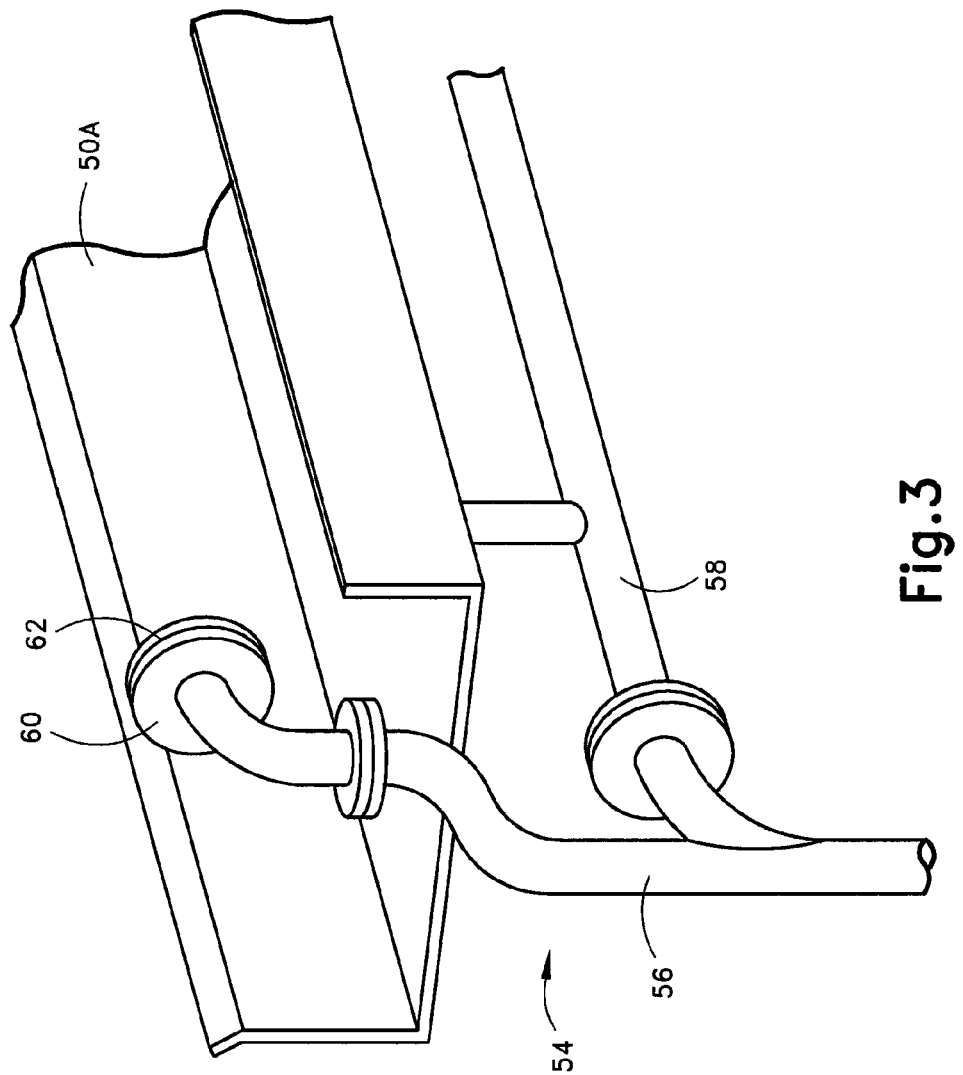
FIG. 3 is a schematic, enlarged illustration showing a vent in accordance with one aspect of the present invention.

The shown example provides the vent 60 at a location above the highest drain pan (i.e., 50A). This permits the vent 60 to be open to the atmosphere within the evaporative cooler 10 and yet prevents water 40 from flowing from the highest drain pan (i.e., 50A) directly into the vent 60. FIG. 3 shows one example of a configuration with the vent 60 located above the highest drain pan (i.e., 50A). It is to be appreciated that structure (e.g., a wall segment, not shown for clarity) may be present and the vent 60 may be attached to and/or supported by such structure. In the shown example, the vent has a flange 62 that may be affixed to such structure.

It is to be noted again that the vent 60 is open to the atmosphere within the evaporative cooler 10. This atmosphere is filtered air. Thus, no contaminants from outside of the evaporative cooler 10 are introduced into the water 40/drain pipe arrangement 54/water supply arrangement 34 via passage through the vent 60.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An evaporative cooler, the evaporative cooler including:
a cooling housing having an air inlet and an air outlet;
an evaporation media, located within the cooling housing intermediate the air inlet and the air outlet for air flow there through and for receiving water to permit evaporation of at least some water;
a drain pan located within the cooling housing and below the evaporation media to catch water which has not evaporated and has fallen from the evaporation media;
a sump located within the cooling housing and below the drain pan for collecting water for use in supplying water to the evaporation media;
a pipe connecting the drain pan to the sump for water movement from the drain pan to the sump; and
an air vent located within the cooling housing and connected to the pipe, the air vent being open to air within the cooling housing and above the drain pan to permit release of air from within the pipe;
wherein the evaporation media is a first evaporation media and the evaporative cooler includes a plurality of evaporation media each located within the cooling housing intermediate the air inlet and the air outlet for air flow there through and for receiving water to permit evaporation of at least some water, the drain pan is a first drain pan and the evaporative cooler includes a plurality of drain pans each located within the cooling housing and below a respective evaporation media to catch water which has not evaporated and falling from the respective evaporation media, the pipe is connected to all of the drain pans for water movement from all of the drain pans to the sump, the air vent is located above a highest of the drain pains.

2. An evaporative cooler as set forth in claim 1, wherein plural evaporation media and the respective plural drain pans are oriented vertically relative to each other.

3. An evaporative cooler as set forth in claim 1, wherein the pipe is a vertical pipe segment of a drain pipe arrangement.

4. An evaporative cooler as set forth in claim 1, wherein a filtering device is located at the air inlet of the cooling housing such that air within the cooling housing is filtered, the vent being open to the filtered air within the cooling housing.

5. An evaporative cooler as set forth in claim 1, wherein the air vent is not exposed to air outside of the cooling housing.

* * * * *